(12) United States Patent
Kwatra et al.

(10) Patent No.: US 8,798,393 B2
(45) Date of Patent: Aug. 5, 2014

(54) REMOVING ILLUMINATION VARIATION FROM IMAGES

(75) Inventors: Vivek Kwatra, Santa Clara, CA (US); Mei Han, Palo Alto, CA (US)

(73) Assignee: Google Inc., Mountain View, CA (US)

( * ) Notice: Subject to any disclaimer, the term of this patent is extended or adjusted under 35 U.S.C. 154(b) by 218 days.

(21) Appl. No.: 13/308,411

(22) Filed: Nov. 30, 2011

(65) Prior Publication Data

US 2012/0141044 A1     Jun. 7, 2012

Related U.S. Application Data

(60) Provisional application No. 61/418,853, filed on Dec. 1, 2010.

(51) Int. Cl.
*G06K 9/40*     (2006.01)

(52) U.S. Cl.
USPC ........... 382/274; 382/260; 382/275; 382/278; 358/3.26; 358/3.27; 358/463

(58) Field of Classification Search
USPC ........ 382/260, 274, 275, 278; 358/3.26, 3.27, 358/463
See application file for complete search history.

(56) References Cited

U.S. PATENT DOCUMENTS

| | | | |
|---|---|---|---|
| 5,003,618 A | 3/1991 | Meno | |
| 5,081,656 A | 1/1992 | Baker et al. | |
| 5,235,434 A | 8/1993 | Wober | |
| 5,325,449 A | 6/1994 | Burt et al. | |
| 5,455,870 A | 10/1995 | Sepai et al. | |
| 5,488,674 A | 1/1996 | Burt et al. | |
| 5,497,430 A | 3/1996 | Sadovnik et al. | |
| 5,537,669 A | 7/1996 | Evans et al. | |
| 5,761,329 A | 6/1998 | Chen et al. | |
| 5,841,129 A * | 11/1998 | Bacsa | 250/216 |
| 5,963,670 A | 10/1999 | Lipson et al. | |
| 6,005,247 A | 12/1999 | Baum | |
| 6,016,196 A * | 1/2000 | Mermelstein | 356/477 |
| 6,055,097 A * | 4/2000 | Lanni et al. | 359/386 |
| 6,091,846 A | 7/2000 | Lin et al. | |
| 6,201,541 B1 | 3/2001 | Shalom et al. | |
| 6,205,239 B1 | 3/2001 | Lin et al. | |
| 6,240,423 B1 | 5/2001 | Hirata | |
| 6,246,788 B1 | 6/2001 | Pattikonda et al. | |
| 6,249,601 B1 | 6/2001 | Kim et al. | |
| 6,249,616 B1 | 6/2001 | Hashimoto | |

(Continued)

OTHER PUBLICATIONS

"Iteratively reweighted least squares," Wikipedia, Last Modified Jun. 23, 2009, 2 pages, [online] [Retrieved on Jul. 14, 2009] Retrieved from the internet <URL:http://en.wikipedia.org/wiki/Iteratively_reweighted_least_squares>.

(Continued)

*Primary Examiner* — Yosef Kassa (74) *Attorney, Agent, or Firm* — Fenwick & West LLP (57) ABSTRACT

An image comprising varying illumination is selected. Patches of pixels from among the plurality of pixels with the image are identified. Similarities between pairs of patches of pixels based on pixel intensities associated with the pairs of patches of pixels are calculated. Illumination values for the plurality of pixels within the image based on the calculated similarities between the pairs of patches of pixels is calculated. The illumination variation from the image is removed based on the calculated illumination values for the plurality of pixels within the image.

31 Claims, 5 Drawing Sheets

(56) References Cited

U.S. PATENT DOCUMENTS

| | | |
|---|---|---|
| 6,253,173 B1 | 6/2001 | Ma |
| 6,255,642 B1* | 7/2001 | Cragg et al. ............... 250/216 |
| 6,269,179 B1 | 7/2001 | Vachtsevanos et al. |
| 6,292,582 B1 | 9/2001 | Lin et al. |
| 6,459,821 B1 | 10/2002 | Cullen |
| 6,463,426 B1 | 10/2002 | Lipson et al. |
| 6,466,694 B2 | 10/2002 | Kamada et al. |
| 6,477,275 B1 | 11/2002 | Melikian et al. |
| 6,483,938 B1 | 11/2002 | Hennessey et al. |
| 6,516,085 B1 | 2/2003 | Wiley et al. |
| 6,535,650 B1 | 3/2003 | Poulo et al. |
| 6,587,581 B1 | 7/2003 | Matsuyama et al. |
| 6,665,432 B1 | 12/2003 | Evans et al. |
| 6,674,890 B2 | 1/2004 | Maeda et al. |
| 6,675,174 B1 | 1/2004 | Bolle et al. |
| 6,681,056 B1 | 1/2004 | Tseng et al. |
| 6,683,984 B1 | 1/2004 | Simske et al. |
| 6,701,026 B1 | 3/2004 | Zheng et al. |
| 6,762,769 B2 | 7/2004 | Guo et al. |
| 6,766,047 B2 | 7/2004 | Muraki et al. |
| 6,826,300 B2 | 11/2004 | Liu et al. |
| 6,898,331 B2 | 5/2005 | Tiana |
| 7,006,671 B2 | 2/2006 | Yamaguchi |
| 7,120,626 B2 | 10/2006 | Li et al. |
| 7,126,137 B2* | 10/2006 | Singer et al. ............. 250/492.1 |
| 7,272,241 B2* | 9/2007 | Demi et al. ................. 382/103 |
| 7,295,324 B2* | 11/2007 | Jones et al. ................ 356/498 |
| 7,315,642 B2 | 1/2008 | Bartov |
| 7,358,994 B2 | 4/2008 | Yano |
| 7,366,323 B1 | 4/2008 | Yao |
| 7,376,251 B2 | 5/2008 | Stober |
| 7,388,979 B2 | 6/2008 | Sakai et al. |
| 7,440,637 B2* | 10/2008 | Schechner et al. ........... 382/284 |
| 7,445,344 B2* | 11/2008 | Lang et al. ................... 353/98 |
| 7,447,338 B2 | 11/2008 | Kim |
| 7,577,313 B1 | 8/2009 | Georgiev |
| 7,653,491 B2 | 1/2010 | Schadt et al. |
| 7,668,787 B2 | 2/2010 | Bier |
| 7,697,746 B2 | 4/2010 | Kawaguchi |
| 7,706,599 B2* | 4/2010 | Sim .............................. 382/149 |
| 7,706,603 B2 | 4/2010 | Najafi et al. |
| 7,724,960 B1 | 5/2010 | Mikhael et al. |
| 7,734,097 B1 | 6/2010 | Porikli et al. |
| 7,778,488 B2 | 8/2010 | Nord et al. |
| 7,783,102 B2 | 8/2010 | Kawaragi |
| 7,801,335 B2* | 9/2010 | Hanna et al. ................ 382/117 |
| 7,803,633 B2* | 9/2010 | Spivey et al. ............... 436/164 |
| 7,876,974 B2* | 1/2011 | Brajovic ...................... 382/264 |
| 7,941,004 B2 | 5/2011 | Zhu et al. |
| 7,957,565 B1 | 6/2011 | Sharma et al. |
| 8,001,157 B2 | 8/2011 | Bier |
| 8,005,292 B2 | 8/2011 | Sakai et al. |
| 8,023,742 B2 | 9/2011 | Brown et al. |
| 8,090,429 B2 | 1/2012 | Vija et al. |
| 8,103,090 B2 | 1/2012 | Ma et al. |
| 8,131,786 B1 | 3/2012 | Bengio et al. |
| 8,139,883 B2* | 3/2012 | Zhang et al. ............... 382/254 |
| 8,175,376 B2 | 5/2012 | Marchesotti et al. |
| 8,260,008 B2* | 9/2012 | Hanna et al. ............... 382/115 |
| 8,345,940 B2* | 1/2013 | Mattiuzzi et al. ........... 382/128 |
| 8,369,579 B2* | 2/2013 | Frigerio ....................... 382/107 |
| 8,369,608 B2* | 2/2013 | Gunaratne ................... 382/154 |
| 8,384,806 B2* | 2/2013 | Robinson et al. ............ 348/243 |
| 8,391,634 B1 | 3/2013 | Kwatra et al. |
| 8,396,325 B1 | 3/2013 | Kwatra et al. |
| 2001/0055429 A1 | 12/2001 | Hirosawa et al. |
| 2003/0016881 A1 | 1/2003 | Matsuura |
| 2003/0142860 A1 | 7/2003 | Glasser et al. |
| 2003/0169906 A1 | 9/2003 | Gokturk et al. |
| 2003/0190090 A1 | 10/2003 | Beeman et al. |
| 2004/0032979 A1 | 2/2004 | Honda et al. |
| 2004/0139067 A1 | 7/2004 | Houle |
| 2004/0169658 A1 | 9/2004 | Shin et al. |
| 2004/0202361 A1 | 10/2004 | Evans et al. |
| 2005/0100209 A1 | 5/2005 | Lewis et al. |
| 2005/0104974 A1 | 5/2005 | Watanabe et al. |
| 2005/0141002 A1 | 6/2005 | Takano et al. |
| 2005/0149494 A1 | 7/2005 | Lindh et al. |
| 2005/0163397 A1 | 7/2005 | Baldwin |
| 2005/0179910 A1 | 8/2005 | Bartov |
| 2005/0238198 A1 | 10/2005 | Brown et al. |
| 2006/0017739 A1 | 1/2006 | Fang et al. |
| 2006/0018539 A1 | 1/2006 | Sato et al. |
| 2006/0023944 A1 | 2/2006 | Oisel et al. |
| 2006/0034540 A1 | 2/2006 | Zavadsky et al. |
| 2006/0082849 A1 | 4/2006 | Kaku |
| 2006/0188113 A1 | 8/2006 | Tice et al. |
| 2006/0215882 A1 | 9/2006 | Ando et al. |
| 2006/0233423 A1 | 10/2006 | Najafi et al. |
| 2006/0244757 A1 | 11/2006 | Fang et al. |
| 2007/0050411 A1 | 3/2007 | Hull et al. |
| 2007/0104389 A1 | 5/2007 | Wells |
| 2007/0140556 A1 | 6/2007 | Willamowski et al. |
| 2007/0183629 A1 | 8/2007 | Porikli et al. |
| 2007/0248282 A1 | 10/2007 | Suzuki |
| 2007/0269107 A1 | 11/2007 | Iwai et al. |
| 2007/0280556 A1 | 12/2007 | Mullick et al. |
| 2007/0282935 A1 | 12/2007 | Khan et al. |
| 2007/0286523 A1 | 12/2007 | Kim et al. |
| 2007/0297653 A1 | 12/2007 | Bolle et al. |
| 2008/0025635 A1 | 1/2008 | Han et al. |
| 2008/0063238 A1 | 3/2008 | Wiedemann et al. |
| 2008/0118151 A1 | 5/2008 | Bouguet et al. |
| 2008/0118160 A1 | 5/2008 | Fan et al. |
| 2008/0130960 A1 | 6/2008 | Yagnik |
| 2008/0235216 A1 | 9/2008 | Ruttenberg |
| 2008/0253681 A1 | 10/2008 | Chesnokov |
| 2008/0260274 A1 | 10/2008 | Winder et al. |
| 2009/0003725 A1 | 1/2009 | Merkel et al. |
| 2009/0034835 A1 | 2/2009 | Maxwell et al. |
| 2009/0208106 A1 | 8/2009 | Dunlop et al. |
| 2009/0252428 A1 | 10/2009 | Winder |
| 2009/0274385 A1 | 11/2009 | Zhu et al. |
| 2010/0008581 A1 | 1/2010 | Bressan |
| 2010/0013965 A1 | 1/2010 | Pugh et al. |
| 2010/0026888 A1 | 2/2010 | Pearlstein et al. |
| 2010/0040285 A1 | 2/2010 | Csurka et al. |
| 2010/0080472 A1 | 4/2010 | Asano |
| 2010/0191722 A1 | 7/2010 | Boiman et al. |
| 2010/0272357 A1 | 10/2010 | Maxwell et al. |
| 2011/0035035 A1 | 2/2011 | Khan et al. |
| 2011/0158533 A1 | 6/2011 | Gutelzon et al. |
| 2011/0202528 A1 | 8/2011 | Deolalikar et al. |
| 2011/0280453 A1 | 11/2011 | Chen et al. |
| 2011/0286628 A1 | 11/2011 | Goncalves et al. |
| 2011/0297369 A1 | 12/2011 | Kumaran et al. |
| 2011/0304729 A1 | 12/2011 | Arcaini et al. |
| 2011/0311129 A1 | 12/2011 | Milanfar et al. |
| 2012/0020546 A1 | 1/2012 | Inoue et al. |
| 2012/0045134 A1 | 2/2012 | Perronnin et al. |
| 2012/0099796 A1 | 4/2012 | Zitnick, III |
| 2012/0141044 A1 | 6/2012 | Kwatra et al. |
| 2012/0281923 A1 | 11/2012 | Irani et al. |
| 2013/0051685 A1 | 2/2013 | Shechtman et al. |
| 2013/0156315 A1 | 6/2013 | Friedhoff et al. |
| 2013/0182909 A1 | 7/2013 | Rodriguez-Serrano |

OTHER PUBLICATIONS

Boiman, O., et al., In defense of nearest-neighbor based image classification, IEEE Conference on Computer Vision and Pattern Recognition, Jun. 23-28, 2008, pp. 1-8.

Dai, S., et al., "Soft edge smoothness prior for alpha channel super resolution," IEEE Conference on Computer Vision and Pattern Recognition, 2007, 8 pages.

Efros, A., et al., "Image quilting for texture synthesis and transfer," Computer Graphics Annual Conference (SIGGRAPH 2001); Los Angeles, CA; United States; Aug. 12-17, 2001. pp. 341-346.

Efros, A., et al., "Texture Synthesis by Non-parametric Sampling," 7th IEEE International Conference on Computer Vision, Sep. 20-27, 1999, 10 Pages.

Elad, M., et al., "Restoration of single super-resolution image from several blurred, noisy and down-sampled measured images," IEEE

(56) References Cited

OTHER PUBLICATIONS

Transactions on Image Processing, Dec. 1997, pp. 1646-1658, vol. 6, No. 12.
Elkan, C., Using the triangle inequality to accelerate k-means, Proceedings of the Twentieth International Conference on Machine Learning (ICML-2003), Washington DC, 2003, 7 pages.
Farsiu, S., et al., "Fast and robust multiframe super resolution," IEEE Transactions on Image Processing, Oct. 2004, pp. 1327-1344, vol. 13, Is. 10.
Finlayson, G.D., et al., Removing shadows from images, ECCV 2002: European Conference on Computer Vision, 2002, 14 pages.
Freeman, W.T., et al., "Example-based super resolution," IEEE Computer Graphics and Applications, 2002, 14 pages.
Grauman, K., et al., "Approximate correspondence in high dimensions," In NIPS, 2006, 8 pages.
Han, J., et al., "Fast example-based surface texture synthesis via discrete optimization," The Visual Computer, 2006, pp. 918-925, vol. 22.
Hays, J., et al., "Scene completion using millions of photographs," ACM Transactions on Graphics GRAPH, 2007, vol. 26, No. 3.
Irani, M., et al., "Motion analysis for image enhancement: Resolution, occlusion and transparency," Journal of Visual Communication and Image Representation, 1993, 24 pages.
Korah, T., et al., "Analysis of building textures for reconstructing partially occluded facades," European Conference on Computer Vision, 2008, 14 pages.
Kumar, N., et al., "What is a good nearest neighbors algorithm for finding similar patches in images," ECCV, 2008.
Kwatra, V., et al., "Graphcut textures: Images and video synthesis using graph cuts," ACM Transactions on Graphics, Jul. 2003, pp. 277-286, vol. 22, No. 3.
Kwatra, V., et al, "Texture optimization for example-based synthesis," ACM Transactions on Graphics, SIGGRAPH, 2005, pp. 795-802, vol. 24, No. 3.
Lefebvre, S., et al., "Parallel controllable texture synthesis," ACM SIGGRAPH, 2005, pp. 777-786.
Mohan, A., et al., "Editing soft shadows in a digital photograph," IEEE Computer Graphics and Applications, 2007, pp. 23-31, vol. 27, No. 2.
Muller, P., et al., "Image -based procedural modeling of facades," ACM Transactions on Graphics, Jul. 2007, pp. 85-1 to 85-10, vol. 26, No. 3.
Park, M., et al., "Deformed Lattice Detection via Mean-Shift Belief Propagation," European Conference on Computer Vision (ECCV), Oct., 2008, pp. 474-485.
Pauly, M., et al., "Discovering structural regularity in 3rd geometry," ACM Transactions on Graphics, 2008, 11 Pages.
Salvador, E., et al., "Cast shadow segmentation using invariant color features, Computer vision and image understanding," Computer Vision and Image Understanding, 2004, pp. 238-259, vol. 95.
Schindler, G., et al. "Detecting and matching repeated patterns for automatic geo-tagging in urban environments," Computer Vision and Pattern Recognition, CVPR, 2008, pp. 1-7.
Shotton, J., et al., "Semantic texton forest for image categorization and segmentation," Computer Vision and Pattern Recognition, CVPR, 2008, pp. 1-8.
Sun, J., et al., "Image hallucination with primal sketch priors," Computer Vision and Pattern Recognition, 2003, 8 pages.
Torralba, A., et al., "Context-based vision system for place and object recognition," Proceedings. Ninth IEEE International Conference, Oct. 13-16, 2003, pp. 273-380, vol. 1.
Vazquez, E., et al., "Image segmentation in the presence of shadows and highlights," Computer Vision—ECCV, 2008, 14 pages.
Wang, Q., et al., "Patch based blind image super resolution," ICCV 2005. Tenth IEEE International Conference, Oct. 17-21, 2005, pp. 709-716, vol. 1.
Wang, H., et al., "Factoring repeated content within and among images," International Conference on Computer Graphics and Interactive Techniques, ACM SIGGRAPH 2008, 10 pages.
Wu, T., et al., "Natural shadow matting, "ACM Transactions on Graphics, Jun. 2009, Pages , vol. 26, Issue 2, Article 8.
Zhao, T., et al., "Segmentation and tracking of multiple humans in complex situations," CVPR, 2001, 8 Pages.
Cao, G., et al., "Covariance estimation for high dimensional data vectors using the sparse matrix transform," In Daphne Koller, Dale Schuurmans, Yoshua Bengio, and Lon Bottou, editors, NIPS, pp. 225-232. MIT Press, 2008.
Higham, N.J., "Computing the nearest correlation matrix a problem from finance," IMA Journal of Numerical Analysis, 22(3):329-343, 2002.
Jain, A. K., et al., "Statistical pattern recognition: A review," IEEE Transactions on Pattern Analysis and Machine Intelligence, 22(1):4-37, 2000.
Porikli, W. F., et al., "Fast construction of covariance matrices for arbitrary size image windows," In Proc. Intl. Conf. on Image Processing, pp. 1581-1584, 2006.
Qi, J., et al., "Fast computation of the covariance of map reconstructions of pet images," vol. 3661, pp. 344-355, 1999.
Stein, C., et al., "Improving the usual estimator of a normal covariance matrix," Dept. of Statistics, Stanford University, Report 37, 1972.
PCT International Search Report and Written Opinion, PCT/US2011/062787, May 4, 2012, 5 Pages.
Arbel, E., "Texture-preserving shadow removal in color images containing curved surfaces," In CVPR, 2007, 8 pages.
Awate, S. P., et al., "Unsupervised, information theoretic, adaptive image filtering for image restoration," IEEE Transactions on Pattern Analysis and Machine Intelligence, Mar. 2006, pp. 364-376, vol. 28, No. 3.
Bell, M., et al., Learning local evidence for shading and reflectance. In ICCV, 2001, pp. 670-677.
Bousseau, A., et al., User-assisted intrinsic images. In SIGGRAPH Asia, Dec. 2009, pp. 130:1-130:10, vol. 28, No. 5.
Finlayson, G., et al., "Detecting illumination in images," In ICCV, IEEE, 2007, 8 pages.
Finlayson, G., et al., "Entropy minimization for shadow removal," International Journal of Computer Vision, 2009, pp. 35-57, vol. 85.
Finlayson, G., et al., "Intrinsic images by entropy minimization," In ECCV, 2004, pp. 582-595, LNCS 3023.
Jiang, X., et al., "Correlation-based intrinsic image extraction from a single image," 11$^{th}$ European Conference on Computer Vision—ECCV, Sep. 5-11, 2010, pp. 58-71, LNCS 6314, Part IV.
Kwatra, V., et al., "Shadow Removal for Aerial Imagery by Information Theoretic Intrinsic Image Analysis," International Conference on Computational Photography, IEEE, 2012, 8 pages.
Lalonde, J.-F., et al., "Detecting ground shadows in outdoor consumer photographs," 11$^{th}$ European Conference on Computer Vision—ECCV, Sep. 5-11, 2010, pp. 321-335, LNCS 6312, Part II.
Liu, F., et al., "Texture-consistent shadow removal," 10$^{th}$ European Conference on Computer Vision-ECCV, Oct. 12-18, 2008, pp. 437-450, LNCS 5305, Part IV.
Maxwell, B., et al., "A bi-illuminant dichromatic reflection model for understanding images," In CVPR, IEEE 2008, 8 Pages.
Narasimhan, S., et al., "A class of photometric invariants: Separating material from shape and illumination," Proceedings of the Ninth IEEE International Conference on Computer Vision, 2003, 8 Pages.
Principle, J. C., et al., "Information-theoretic learning using renyi's quadratic entropy," In Proceedings of the First International Workshop on Independent Component Analysis and Signal Separation, Aussois, pp. 407-412, 1999.
Shor, Y., et al., "The shadow meets the mask: Pyramid-based shadow removal," in Eurographics, 2008, 10 Pages, vol. 27, No. 2.
Tappen, M., et al., "Recovering intrinsic images from a single image," IEEE Trans. Pattern Anal. Mach. Intell., Sep. 2005, pp. 1459-1472, vol. 27, No. 9.
Weiss, Y., "Deriving intrinsic images from image sequences," In ICCV, 2001, pp. 68-75.
Wu, T.-P., et al., "A bayesian approach for shadow extraction from a single image," Proceedings of the 10$^{th}$ IEEE International Conference on Computer Vision, 2005, 8 Pages.
Zhu, J., et al., "Learning to recognize shadows in monochromatic natural images," in CVPR, 2010, pp. 223-230.

(56) References Cited

OTHER PUBLICATIONS

Datta, R. et al., "Content-Based Image Retrieval-Approaches and Trends of the New Age," MIR, 2005, pp. 1-10.

Deselaers, T. et al., "Features for Image Retrieval: An Experimental Comparison," Information Retrieval, 2008, pp. 1-22, vol. 11, No. 2.

Deselaers, T. et al., "Content-Based Image Retrieval, Tutorial Image Retrieval," Tutorial ICPR, 2008, pp. 1-66.

Idrissi, K. et al., "Multi-Component Entropy Segmentation for Color Image Retrieval," Image and Signal Processing and Analysis, 2001, pp. 132-137.

Ke, Y. et al., "Efficient Near-Duplicate Detection and Sub-Image Retrieval," ACM Multimedia, 2004, pp. 1-9.

Oliva, A. et al., "Building the Gist of a Scene: The Role of Global Image Features in Recognition," Progress in Brain Research, 2006, pp. 1-19.

Rahman, M. et al., "A Feature Level Fusion in Similarity Matching to Content-Based Image Retrieval," 2006 9$^{th}$ International Conference on Information Fusion, 2006, pp. 1-6.

Raoui, Y. et al., "Global and Local Image Descriptors for Content Based Image Retrieval and Object Recognition," Applied Mathematical Sciences, 2010, pp. 2109-2136, vol. 5, 2011, No. 42.

Smeulders, A. et al., "Content-Based Image Retrieval at the End of the Early Years," IEEE Transactions on Pattern Analysis and Machine Intelligence, 2000, pp. 1349-1380, vol. 22, No. 12.

Yang, J. et al., "Evaluating Bag-of-Visual-Worlds Representations in Scene Classification," MIR, 2007, pp. 197-206.

Bouveyron, C., et al., "Dimension Reduction and Classification Methods for Object Recognition in Vision," 5$^{th}$ French-Danish Workshop on Spatial Statistics and Image Analysis in Biology, 2004, pp. 1-4.

Ma, H., et al., "Shadow Segmentation and Compensation in High Resolution Satellite Images," IEEE, 2008, pp. II-1036-11-1039.

\* cited by examiner

REMOVING ILLUMINATION VARIATION FROM IMAGES

CROSS-REFERENCE TO RELATED APPLICATIONS

This application claims the benefit of U.S. Provisional Application No. 61/418,853, filed Dec. 1, 2010, which is incorporated by reference in its entirety.

FIELD OF ART

The present disclosure generally relates to the field of digital image processing, and more specifically, to methods of estimating illuminations in images.

BACKGROUND

Many current information systems, such as map applications, store large quantities of digital images that provide views of the surrounding area for a given map location. Many of these images include undesirable characteristics such as uneven ambient illumination that degrade the content of the images. For example, some map systems contain aerial images which often contain undesirable shadows caused by clouds or other objects. Thus, such images may include an uneven illumination caused by objects which occlude the light source of the image. The presence of the uneven illumination in the images thereby results in undesirable characteristics due to the lack of uniformity of color intensity in the images. As a result, these systems provide users with images of less than desirable quality.

SUMMARY

The problems described above are met by a computer-implemented method, a non-transitory computer-readable storage medium and a computer system for removing illumination variation from an image. One embodiment of the computer-implemented method comprises selecting an image containing varying illumination across a plurality of pixels within the image. Patches of pixels from among the plurality of pixels within the image are identified. Similarities between pairs of patches of pixels are calculated based on pixel intensities associated with the pairs of patches of pixels. Illumination values for the plurality of pixels within the image are calculated based on the calculated similarities between the pairs of patches of pixels. The illumination variation from the image is removed based on the calculated illumination values for the plurality of pixels within the image.

Embodiments of the non-transitory computer-readable storage medium store computer-executable code for removing illumination variation from an image. The code are executable to perform steps comprising selecting an image containing varying illumination across a plurality of pixels within the image and identifying patches of pixels from among the plurality of pixels within the image. The steps further include calculating similarities between pairs of patches of pixels based on pixel intensities associated with the pairs of patches of pixels and calculating illumination values for the plurality of pixels within the image based on the calculated similarities between the pairs of patches of pixels. Furthermore, the steps comprise removing the illumination variation from the image based on the calculated illumination values for the plurality of pixels within the image.

Embodiments of the computer system for removing an illumination variation from an image comprises a computer processor and a non-transitory computer-readable storage medium storing executable instructions configured to execute on the computer processor. The instructions when executed by the computer processor are configured to perform steps comprising selecting an image containing varying illumination across a plurality of pixels within the image and identifying patches of pixels from among the plurality of pixels within the image. The steps further include calculating similarities between pairs of patches of pixels based on pixel intensities associated with the pairs of patches of pixels and calculating illumination values for the plurality of pixels within the image based on the calculated similarities between the pairs of patches of pixels. Furthermore, the steps comprise removing the illumination variation from the image based on the calculated illumination values for the plurality of pixels within the image.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

The figures depict, and the detail description describes, various non-limiting embodiments for purposes of illustration only. One skilled in the art will readily recognize from the following discussion that alternative embodiments of the structures and methods illustrated herein may be employed without departing from the principles described herein.

DETAILED DESCRIPTION

System Architecture

Figure 1:
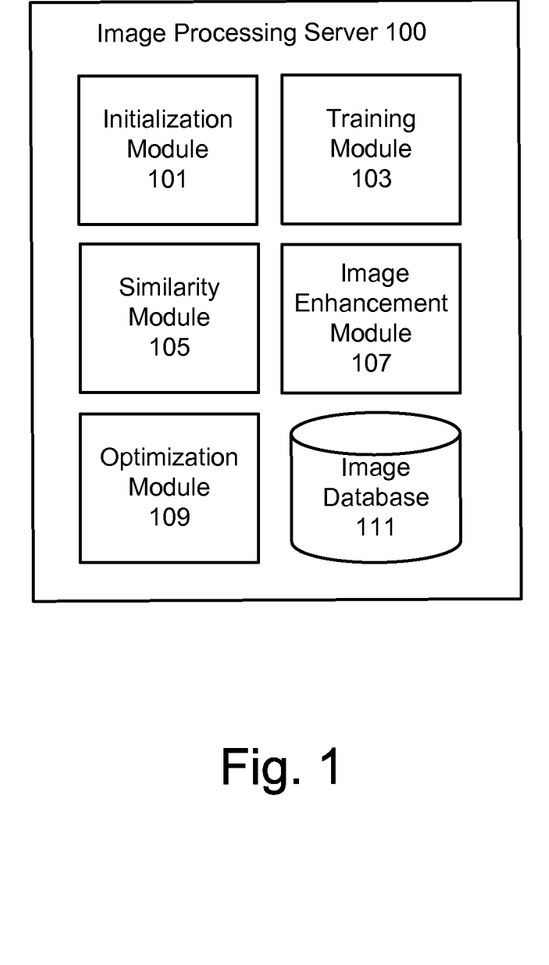
FIG. 1 is a high-level block diagram of an image processing server in accordance with one embodiment.

FIG. 1 is a high-level block diagram illustrating a detailed view of an image processing server 100 for removing illumination variation from images in accordance with one embodiment. In one embodiment, an illuminated image comprises an image showing a scene having ambient illumination such as shadows. An illuminated image may be represented as an underlying non-illuminated image and an illumination map. In one embodiment, the illumination map describes the illumination value at each location (x, y) in an image.

Note that the illumination described by the illumination map may vary across the illuminated image. For example, part of the illuminated image can be in shadow and therefore have decreased illumination relative to the remainder of the image. Under this formulation, moreover, an "illumination" can describe both a shadow where light is occluded from an object, and a bright area. Shadows and bright areas are simply variations in the illumination map.

Thus, this description uses the term "illumination" to encompass variations in pixel intensity caused by occlusions. An occlusion-type illumination (i.e., a shadow) can be present in an image, for example, when sunlight incident upon an object (e.g., the ground) shown in the image is partially occluded by a cloud or other object. Thus, the occlusion results in a portion of the image being darker than other portions.

In one embodiment, the observed pixel intensity $\tilde{I}$ of a given pixel in an illuminated image at location (x,y) is based on the following factors:

The luminance $\tilde{L}$ that describes a scalar illumination value of the illumination map for the pixel at location (x, y); and The reflectance $\tilde{R}$ that describes the pixel intensity of the pixel's underlying reflectance value (i.e., the non-illuminated value) for the pixel at location (x, y).

The relationship of these factors to each other is represented by the following equations:

$$\tilde{I}_p = \tilde{L}_p \cdot \tilde{R}_p \quad (1)$$

$$I_p = \log \tilde{I}_p = \log \tilde{L}_p + \log \tilde{R}_p = L_p + R_p \quad (2)$$

In equation 1, the observed intensity $\tilde{I}_p$ for pixel p is expressed in the intensity domain. As shown in equation 1, the observed intensity $\tilde{I}_p$ for pixel p in the intensity domain is the product of the luminance $\tilde{L}_p$ of the pixel p and the reflectance $\tilde{R}_p$ of pixel p. In contrast, the observed intensity $I_p$ for pixel p is expressed in the log domain in equation 2. As shown in equation 2, the observed intensity $I_p$ for pixel p in the log domain is the sum of the log of the luminance $\tilde{L}_p$ and the log of the reflectance $\tilde{R}_p$ of pixel p. In the following discussion, the observed intensities for pixels will be discussed with respect to the log domain.

Generally, the image processing server 100 estimates values of illumination (i.e., illumination intensities) present in an illuminated image using an information theoretic approach that recognizes that any illumination change in an image tends to increase the diversity of observed texture intensities of the reflectance of the image. In one embodiment, the texture at a given pixel location is described as the appearance of the local neighborhood around that location. The information theoretic interpretation of this effect is that the entropy of the texture is increased. Similarly, the presence of texture in the image increases the entropy of the illumination function, which is otherwise mostly smooth except at illumination boundaries.

In one embodiment, the image processing server 100 estimates an illumination value L of a pixel p from an illuminated image based on the illumination values of randomly selected pixels from the image and the illumination values of neighboring pixels of pixel p. In one embodiment, the image processing server 100 minimizes an energy function using the illumination values of the randomly selected pixels and the illumination values of the neighboring pixels to determine the illumination value L of pixel p. Thus, the image processing server 100 can estimate the illumination values L that contribute to the pixel intensities $I_p$ in an illuminated image. Alternatively, the illumination value L of a pixel p may be estimated based on all pixels in the illuminated image.

In one embodiment, the image processing server 100 enhances an illuminated image by removing illumination variation from the image based on the estimated illumination values of the pixels in the image. That is, the image processing server 100 corrects the illumination variation present in the image so that the intensity of the illumination in the image is uniform. By correcting the illumination variation in the image, the image processing server 100 removes any shadows that were previously present in the image. Thus, the values of illumination in the illumination map are zero or as close to zero as possible. In other words, the variation in the illumination map is minimized as much as possible. Values of the illumination map may be equal to zero (in the log domain) if the illumination of the brightest part of an illuminated image is set to zero.

As illustrated in FIG. 1, the image processing server 100 comprises various modules including an initialization module 101, a training module 103, a similarity module 105, an image enhancement module 107, an optimization module 109, and an image database 111. As is known in the art, the term "module" refers to computer program logic utilized to provide the specified functionality. Thus, a module can be implemented in hardware, firmware, and/or software. In one embodiment, program modules are stored on a non-transitory storage device (i.e., a computer program product), loaded into a memory, and executed by a computer processor. Additionally, those of skill in the art will recognize that other embodiments of the image processing server 100 shown in FIG. 1 can have different and/or other modules than the ones described here, and that the functionalities can be distributed among the modules in a different manner.

The image database 111 stores a set of illuminated images. The term "image" as employed herein includes image data in general, such as individual still image files or frames of images from a video file. In one embodiment, the images in the image database 111 may be obtained from a variety of sources, such as from an organization producing aerial or street view images of a portion of a city for use with a map system, such as GOOGLE MAPS, STREET VIEW or GOOGLE EARTH. Likewise, images (including videos) may be obtained from users, e.g. as submitted by a user uploading images to a photo repository such as PICASA WEB, or a video repository such as YOUTUBE or GOOGLE VIDEO.

In one embodiment, at least some of the illuminated images stored in the image database 111 are aerial images. An aerial image comprises an image taken off the ground from an elevated position such as from an aircraft. These aerial images may include shadows caused by clouds or other objects. In one embodiment, at least some of the illuminated images stored in the image database 111 exhibit a repetitive pattern. For example, an image may show a façade of a building with a repeating pattern of windows or an image may show a rug that exhibits a repetitive pattern in its design.

Additionally, the image database 111 stores enhanced versions of the illuminated images. In one embodiment, an enhanced version of an illuminated image comprises only the underlying non-illuminated image. That is, the image database 111 stores versions of the images with the variations in the illumination map removed, so that the illumination across the image is uniform and any shadows or other illumination-related artifacts are absent.

The initialization module 101 initializes the image processing server 100 with initial illumination values that can be used to remove illuminations from illuminated images. For a given image, the initialization module 101 determines an initial illumination value that can be used to remove the illuminations from the image. For a given pixel in the image, the image processing server 100 attempts to improve upon the initial illumination value determined by the initialization module 101 until an illumination value L is determined that removes or reduces the illumination from the pixel.

Generally, the initialization module 101 automatically specifies, for an illuminated image, a mask comprising only non-illuminated (e.g., non-shadowed) pixels. The initialization module 101 constrains the illumination for the pixels in the mask such that the luminance L is zero.

To identify the mask, the initialization module 101 applies k-means clustering (e.g., k is equal to 4) to the illuminated image. As a result, the illuminated image is divided into a plurality of pixel clusters where each cluster has an associated scalar illumination value corresponding to the average scalar illumination value of the pixels in the cluster. The initialization module 101 identifies a pixel cluster from the plurality of pixel clusters that represents non-illuminated pixels of the image based on the scalar illumination values of the clusters.

In one embodiment, for façade images with periodic patterns, the initialization module 101 applies a box filter to the image to divide the image into a plurality of pixel clusters. For an illuminated façade image, the initialization module applies the box filter to the image and determines the average scalar illumination value of the pixels within the box defined by the filter. The initialization module 101 identifies the plurality of pixel clusters based on the average scalar illumination values of the illuminated façade image. According to one embodiment, the size of the box filter in the x and y dimensions (e.g., 15 pixels by 17 pixels) is equivalent to the period of the repetitive pattern in the x and y dimensions for the illuminated image.

To identify the pixel cluster representing non-illuminated pixels of the image, the initialization module 101 extracts features from the plurality of clusters to form feature vectors that describes the clusters. In one embodiment, the extracted features comprise the mean scalar illumination value $\overline{L}_i$ of the pixels i from the cluster, the cluster size (i.e., number of pixels in the cluster), the variance of the scalar illumination values of the pixels in the cluster, the mean intensity value $\overline{I}_i$ of the image, the mean height (in pixels) of the clusters, and the normalized mean intensity value of other clusters j that are not selected as the non-illuminated cluster i such that:

$$\overline{I}_j \cdot \frac{L_i}{L_j}$$

where pixel i≠pixel j. The intuition is that if the selected pixel cluster i represents the non-illuminated cluster, the illumination value $L_i$ and the illumination value $L_j$ together would normalize the pixels from the other clusters, including illuminated clusters, to the right intensity.

When applied to an image—or more specifically, to the feature vectors of the image—the initialization module 101 generates information that describes a measure of how strongly each cluster represents a cluster of non-illuminated pixels. To generate the information, the initialization module 101 applies a set of weights that are associated with features of non-illuminated pixels to a feature vector. Based on the applied weights and the feature vector, the initialization module 101 calculates a score which may be a Boolean score representing whether or not a given cluster represents a non-illuminated pixel cluster. Alternatively, the score is a real number (e.g., ranging from 0.0 to 1.0), integer, or other scalar value representing a measure of likelihood or probability that the cluster represents a non-illuminated pixel cluster. In one embodiment, numbers or scores exceeding some threshold can be considered to indicate that the cluster represents a non-illuminated pixel cluster. In one embodiment, the cluster with a highest score that exceeds the threshold is considered the non-illuminated pixel cluster and the illumination value $\overline{L}_i$ representing the mean illumination values of the identified cluster is used to initialize the image processing server 100 when estimating the illumination values of the image.

In one embodiment, the training module 103 trains the initialization module 101 to identify pixel clusters that represent non-illuminated pixels using a training set of illuminated images (e.g., 90 images). Each image from the training set includes an indication (e.g., a label) of non-illuminated (e.g., non-shadowed) portions of the image. The training module 103 identifies pixel clusters of the image and extracts the features of the image as previously described above. In one embodiment, the training module 103 assigns a positive label (e.g., +1) to the dominant pixel cluster (i.e., the largest pixel cluster) representing the non-illuminated portion of the image which was designated in the image and assigns a negative label (e.g., −1) to all other clusters. The pixel clusters assigned the negative label include other pixel clusters representing non-illuminated portions of the image and other illuminated portions of the image which are not dominant.

The training module 103 applies a training algorithm to the initialization module 101 to learn the set of weights on the features of the training set that are associated with the dominant pixel cluster as previously described above so that the initialization module 101 can recognize non-illuminated portions of illuminated images. In one embodiment, the training algorithm is AdaBoost, the details of which are known to one having ordinary skill in the art.

The similarity module 105 determines the similarity of pixels in illuminated images. The similarity of pixels in an illuminated image is used to determine the illumination values which cause the illumination in the image. The similarity of pixels can be used to determine the illumination values because it is assumed that for pixels with a similar underlying reflectance (i.e., similar pixels), the difference in pixel intensity of the illuminated pixel and the non-illuminated pixel in the log domain (or ratios in the intensity domain) is due to the difference in the illumination values of the pixels.

Figure 2:
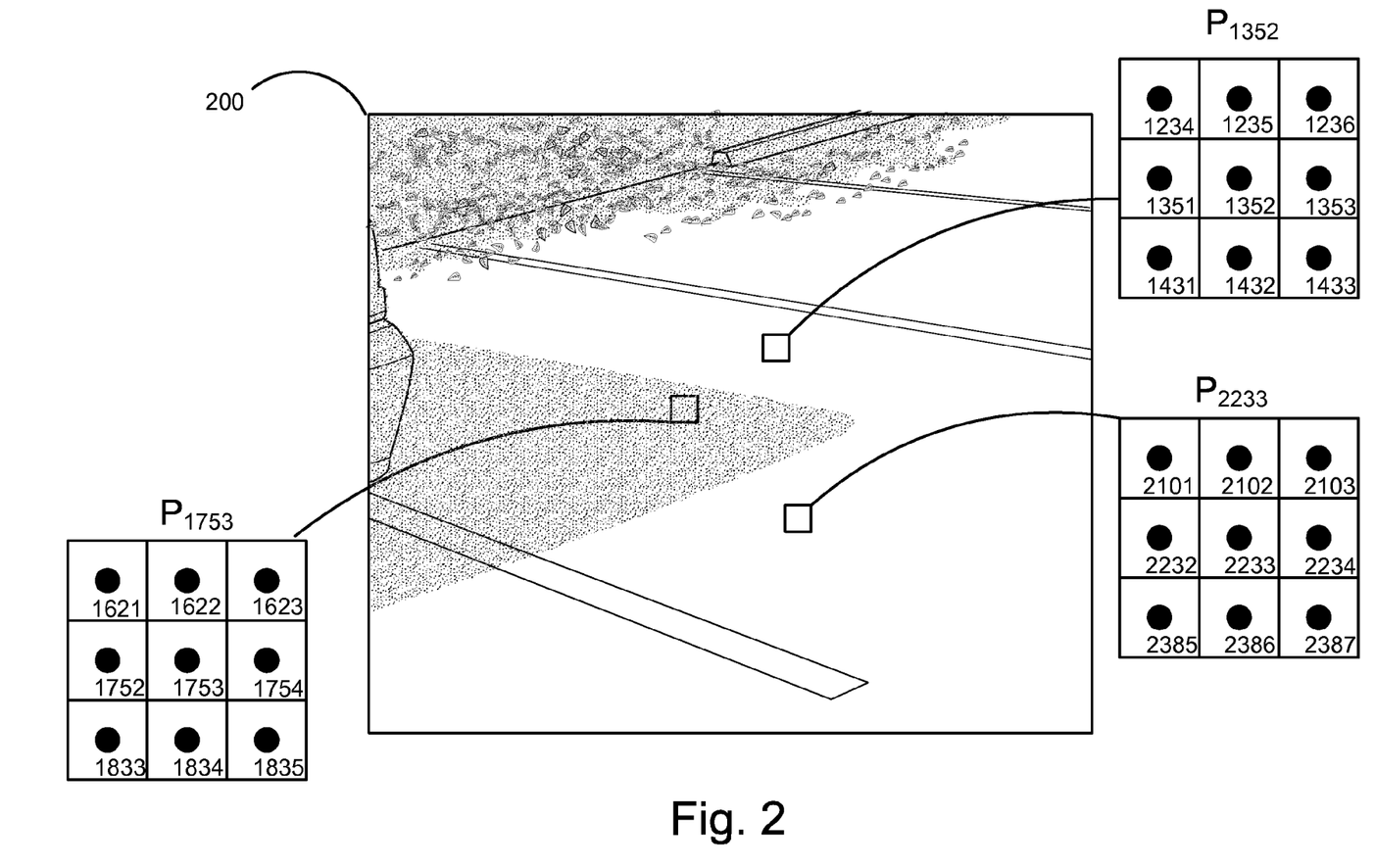
FIG. 2 illustrates an image that includes an illumination in accordance with one embodiment.

To determine the similarity, the similarity module 105 identifies local pixel neighbors for each pixel i in an illuminated image. In one embodiment, the local pixel neighbors of a given pixel i comprise pixels that are spatially located directly adjacent to the pixel i. Pixel i and its local pixel neighbors form a patch $P_i$ with pixel i located at the center of patch $P_i$ in one embodiment. For example, FIG. 2 illustrates an illuminated image 200 and patches $P_{1753}$, $P_{1352}$, and $P_{2233}$. Patch $P_{1753}$ illustrates the local pixel neighbors for pixel $p_{1753}$ which is located at the center of patch $P_{1753}$. Similarly, patch $P_{1352}$ illustrates the pixel neighbors for pixel $p_{1352}$ which is located at the center of patch $P_{1352}$ and patch $P_{2233}$ illustrates the local pixel neighbors for pixel $p_{2233}$ which is located at the center of patch $P_{2233}$.

Referring back to FIG. 1, the similarity module 105 calculates for each patch $P_i$, the reflectance $R_i$ for pixel i located at the center of the patch $P_i$ according to the following equation:

$$R_i = I_i - L_p \qquad (3)$$

In equation 3, the reflectance $R_i$ for the pixel i located at the center of the patch $P_i$ is a function of the intensity of the pixel (which is a known value) and luminance. Note that equation 3 assumes that the illumination value $L_p$ is constant for patch $P_i$ except for at the boundaries of the patch. That is, equation 3 assumes that the illumination value $L_p$ is constant across all the pixels included in patch $P_i$.

In one embodiment, the similarity module 105 identifies a plurality of random pixels j and their local pixel neighbors to compare against pixel i. In one embodiment, the random pixels j represent non-illuminated pixels (i.e., non-shadowed). Each random pixel j and its local pixel neighbors collectively form a patch $P_j$ as previously described above. The similarity module 105 calculates the reflectance $R_j$ for the pixel j located at the center of each patch $P_j$ as described with respect to equation 3.

The similarity module 105 compares pairs of patches to determine the similarity of the patches with respect to reflectance. That is, the similarity module compares patch $P_i$ with each of the plurality of patches $P_j$ to determine the similarity $C(P_i,P_j)$ between patch $P_i$ and patch $P_j$. In one embodiment, the similarity $C(P_i,P_j)$ between patch $P_i$ and patch $P_j$ describes the difference in reflectance of the patches $P_i$ and $P_j$. In one embodiment, the similarity $C(P_i,P_j)$ between patch $P_i$ and patch $P_j$ is represented by the following equation:

$$C(P_i,P_j)=|R_i-R_j|^2 \quad (4)$$

As shown in equation 4, the similarity module 105 may determine the similarity $C(P_i,P_j)$ between patch $P_i$ and patch $P_j$ based on the difference of the reflectance $R_i$ of pixel i from patch $P_i$ and the reflectance $R_j$ of pixel j from patch $P_j$.

Alternatively, the similarity $C(P_i,P_j)$ between patch $P_i$ and patch $P_j$ is represented by the following equation:

$$C(P_i, P_j) = \sum_k (R_{ik} - R_{jk})^2 \quad (5)$$

where k represents each corresponding pixel from patch $P_i$ and patch $P_j$.

In equation 5, the similarity module 105 determines the similarity $C(P_i,P_j)$ between patch $P_i$ and patch $P_j$ based on the reflectance value of all pixels in patch $P_i$ and patch $P_j$. Equation 5 illustrates that the similarity $C(P_i,P_j)$ between patch $P_i$ and patch $P_j$ is based on the summation of the difference of reflectance values across corresponding pairs of pixels from patch $P_i$ and patch $P_j$. For example, for each pixel k in patch $P_i$ and its corresponding pixel k in patch $P_j$, the similarity module 105 determines the difference of the reflectance values of the pair of pixels. The similarity module 105 then sums the square of the differences.

In another embodiment, the similarity $C(P_i,P_j)$ between patch $P_i$ and patch $P_j$ is represented by the following equation:

$$C(P_i,P_j)=|Hist(P_i)-Hist(P_j)|^2 \quad (6)$$

The similarity module 105 may determine a histogram of the reflectance values of pixels within patch $P_i$ which is represented by $Hist(P_i)$ in equation 6. The histogram describes the distribution of the reflectance values of pixels within patch $P_i$. The similarity module 105 also determines a histogram of the reflectance values of pixels within patch $P_j$ which is represented by $Hist(P_j)$. In equation 6, the similarity $C(P_i, P_j)$ between patch $P_i$ and patch $P_j$ is based on the difference between the distribution of the reflectance values of pixels within patch $P_i$ and patch $P_j$.

In one embodiment, the similarity module 105 determines a weight $W_{ij}$ for the similarity $C(P_i,P_j)$ between patch $P_i$ and patch $P_j$. The weight $W_{ij}$ describes the influence that the similarity $C(P_i,P_j)$ between patch $P_i$ and patch $P_j$ has on the determination of the luminance value used to remove the illumination from pixel $p_i$. In one embodiment, the weight $W_{ij}$ is represented by the following equation:

$$W_{ij}=e^{-C(P_i,P_j)} \quad (7)$$

Because the weight is based on a decaying exponential function, the similarity module 105 assigns a higher weight to the similarity $C(P_i,P_j)$ of patch $P_i$ and patch $P_j$ if the patches are similar (i.e., a smaller value of $C(P_i,P_j)$) and the similarity module 105 assigns a lower weight to the similarity $C(P_i,P_j)$ of patch $P_i$ and patch $P_j$ if the patches are not similar (i.e., a larger value of $C(P_i,P_j)$).

Referring now to FIG. 2, the following description is an example of how to determine weights for the pixel patches of image 200. The similarity module 105 selects pixel $p_{1753}$, which is an illuminated pixel. The similarity module 105 identifies the local pixel neighbors for pixel $p_{1753}$ which is represented by patch $P_{1753}$. The similarity module 105 calculates the pixel intensity $P_{1753}I_{1753}$ for pixel $P_{1753}$ according to equation 3 and the mean pixel intensity $P_{1753}I_M$ for patch $P_{1753}$ according to equation 4. Based on the pixel intensity $P_{1753}I_{1753}$ and the mean pixel intensity $P^{1753}I_M$, the similarity module 105 calculates the similarity $P_{1753}{}^M$ of the pixel intensity $P_{1753}I_{1753}$ and the mean pixel intensity $P_{1753}I_M$ according to equation 5.

As described previously, the similarity module 105 also identifies random pixels and their associated patches for comparison against a given pixel. In FIG. 2, the similarity module 105 may randomly identify pixel $p_{1352}$ and pixel $p_{2233}$. Note that the similarity module 105 may identify more than two pixels to compare against pixel $p_{1753}$. However, for ease of description only two randomly selected pixels are illustrated in this example.

The similarity module 105 respectively identifies patch $P_{1352}$ and patch $P_{2233}$ as the local pixel neighbors for pixel $p_{1352}$ and pixel $p_{2233}$. The similarity module 105 calculates the pixel intensities $P_{1352}I_{1352}$ and $P_{2233}I_{2233}$ for pixels $p_{1352}$ and $p_{2233}$ and the mean pixel intensities $P_{1352}I_M$ and $P_{2233}I_M$ for patch $P_{1352}$ and $P_{2233}$ according to equations 3 and 4.

Based on the pixel intensities $P_{1352}I_{1352}$ and $P_{2233}I_{2233}$ and the mean pixel intensities $P_{1352}I_M$ and $P_{2233}I_M$, the similarity module 105 calculates the similarity $P_{1352}{}^M$ of the pixel intensity $P_{1352}I_{1352}$ and the mean pixel intensity $P_{1352}I_M$ and the similarity $P_{2233}{}^M$ of the pixel intensity $P_{2233}I_{2233}$ and the mean pixel intensity $P_{2233}I_M$ according to equation 5. The similarity module 105 determines the respective similarities $C(P_{1753},P_{1352})$ and $C(P_{1753},P_{2233})$ between patch $P_{1753}$ and patches $P_{1352}$ and $P_{2233}$ and their associated weights according to equations 6 and 7.

Referring back to FIG. 1, the optimization module 109 applies an energy function E to solve for illumination values for pixels in an illuminated image. Particularly, the optimization module 109 applies the energy function E to solve for the value of $L_i$ of pixel i in order to remove the illumination from pixel i. In one embodiment, the energy function is represented by the following equation:

$$E = \sum_i \sum_j W_{ij}(L_i - L_j - I_{ij})^2 + \sum V_{ik}(L_i - L_k)^2 \quad (8)$$

where:
$I_{ij}=I_i-I_j$; and
$V_{ik}=\Sigma e^{-(L_i-L_k)^2}$ where k represents a local pixel neighbor of pixel i.

As shown above, the energy E is a sum of two terms. The first term measures the difference between luminance values of a given pixel i of patch $P_i$ and a random pixel j from patch $P_j$ across the plurality of randomly selected pixels j for pixel i. The weight $W_{ij}$ controls the influence that the patches from which pixel i and pixel j are located in the determination of the value of $L_i$. Typically, the pixel intensity $I_{ij}$ of a given pixel is known and is subtracted from the luminance values of pixel i and pixel j.

In one embodiment, the second term of the energy function smoothes the illumination values within a region of the image corresponding to patch $P_i$ (i.e., the local pixel neighbors of pixel i). The optimization module 105 operates under the assumption that the illumination values of pixels within patch $P_i$ should be of equivalent or similar intensity. In the second term of the energy function, the optimization module 109 compares illumination values of pixel i's local pixel neighbors k. The second term of the energy function is based on the summation of the difference between the illumination value $L_i$ of pixel i and the illumination values $L_k$ of neighboring pixel instances.

Furthermore, the second term of the energy function E is multiplied by a weight $V_{ik}$. In one embodiment, weight $V_{ik}$ controls the smoothing factor of the illumination values represented by the second term of the energy function E and is based on a decaying exponential function. Because the weight $V_{ik}$ is based on a decaying exponential function, the smaller the variance in the luminance values between pixel i and neighboring pixels k, the higher the weight $V_{ik}$.

In one embodiment, to solve for the illumination values $L_i$, the optimization module 109 initializes the solution for the energy function E using the initial luminance values determined by the initialization module 101. The optimization module 109 solves for the illumination values $L_i$ using the initial luminance values and iteratively optimizes the energy function E for each pixel location to solve for the illumination value that minimizes the energy function for all locations in order to improve upon the values provided by the initialization module 101.

In one embodiment, the optimization module 109 applies the technique of iteratively re-weighted least squares to solve for the illumination values thereby producing sharper changes in the illumination map. The optimization module 109 creates a matrix based on the weights Wij and Vik that represents the illumination map responsive to solving the energy function. The matrix comprises illumination values for every pixel location in the illuminated image. The illumination values included in the matrix are associated with the weights indicative of the most similar pixels (e.g., the weights with the highest value). Each illumination value in the matrix describes the intensity of the illumination at a particular location in the image.

The image enhancement module 107 enhances illuminated images based on the optimized illumination values described in the matrix. In one embodiment, the image enhancement module 107 enhances an illuminated image by removing illumination variations from the image. To remove the illumination variation (i.e., correct the varying illumination in the image), the optimization module 107 multiplies the pixel intensity of each pixel in the illuminated image in the intensity domain by the inverse of the optimized illumination value for that pixel as determined by the optimization module 109, thereby removing the value of the illumination component from the pixel. By multiplying the inverse of the optimized illumination values for the pixels of the illuminated image by the pixel intensities of the pixels, the optimization module 109 removes the illumination map component of the illuminated image. The enhanced image has uniform intensity such that any shadows or other illumination-related artifacts are absent from the image. The image enhancement module 107 stores the enhanced image in the image database 111.

Figure 3:
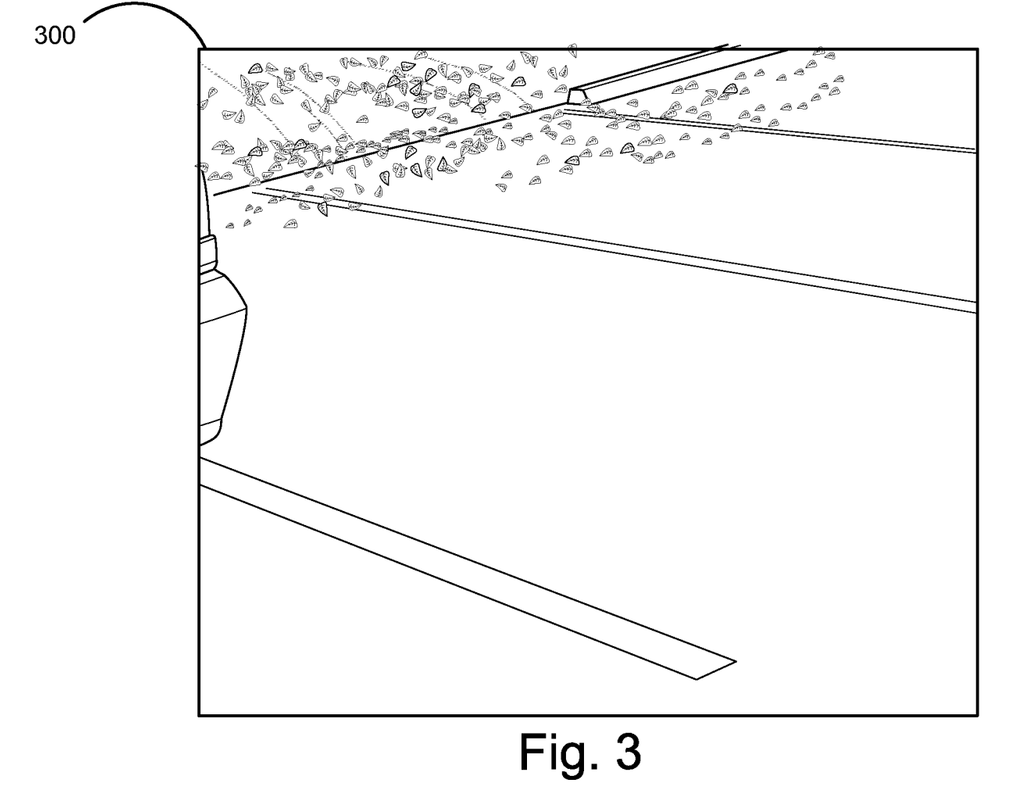
FIG. 3 illustrates the image of FIG. 2 with the illumination removed from the image in accordance with one embodiment.

Referring now to FIG. 3, image 300 illustrates an enhanced image of illuminated image 200 illustrated in FIG. 2. As shown in image 300, the illumination (i.e., the shadow) from image 200 has been removed. Image 300 illustrates uniform pixel intensity of pixels across the image 300.

Figure 4:
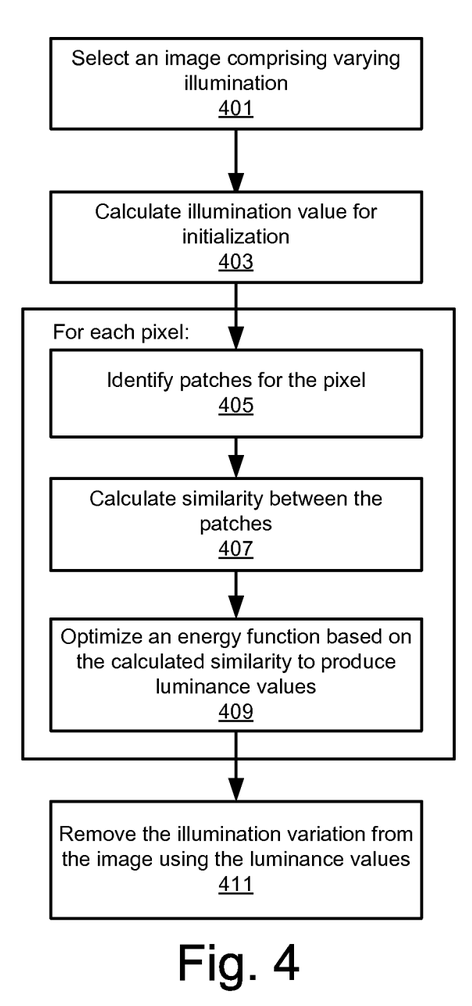
FIG. 4 illustrates a flowchart of the steps performed by the image processing server to remove illumination variation from an image in accordance with one embodiment.

FIG. 4 is a flowchart illustrating steps performed by the image processing server 100 to remove illumination variation from an illuminated image according to one embodiment. Other embodiments perform the illustrated steps in different orders, and/or perform different or additional steps.

In one embodiment, the image processing server 100 selects 401 from the image database 111 an illuminated image comprising varying illumination. The selected image may represent an aerial image, an image exhibiting a repetitive pattern, or any image that includes varying illumination. The image processing server 100 calculates 403 an illumination value to initialize the image processing server 100 that will be used as a starting point to determine the illumination values of the selected image.

For each pixel in the image, the image processing server 100 identifies 405 patches of pixels for the given pixel. The patches may include a patch associated with the local neighbor pixels and patches of randomly selected pixels. The image processing server 100 calculates the similarity 407 between the patches. That is, the image processing server 100 calculates the similarity of pairs of patches where each pair includes a patch comprising the given pixel and a patch associated with a randomly selected pixel. The image processing server 100 then optimizes an energy function based on the calculated similarity to produce an illumination value for each pixel in the image. The image processing server 100 removes 411 the illumination variation from the image by multiplying the intensity of each pixel with its corresponding inversed illumination value determined in step 409.

Figure 5:
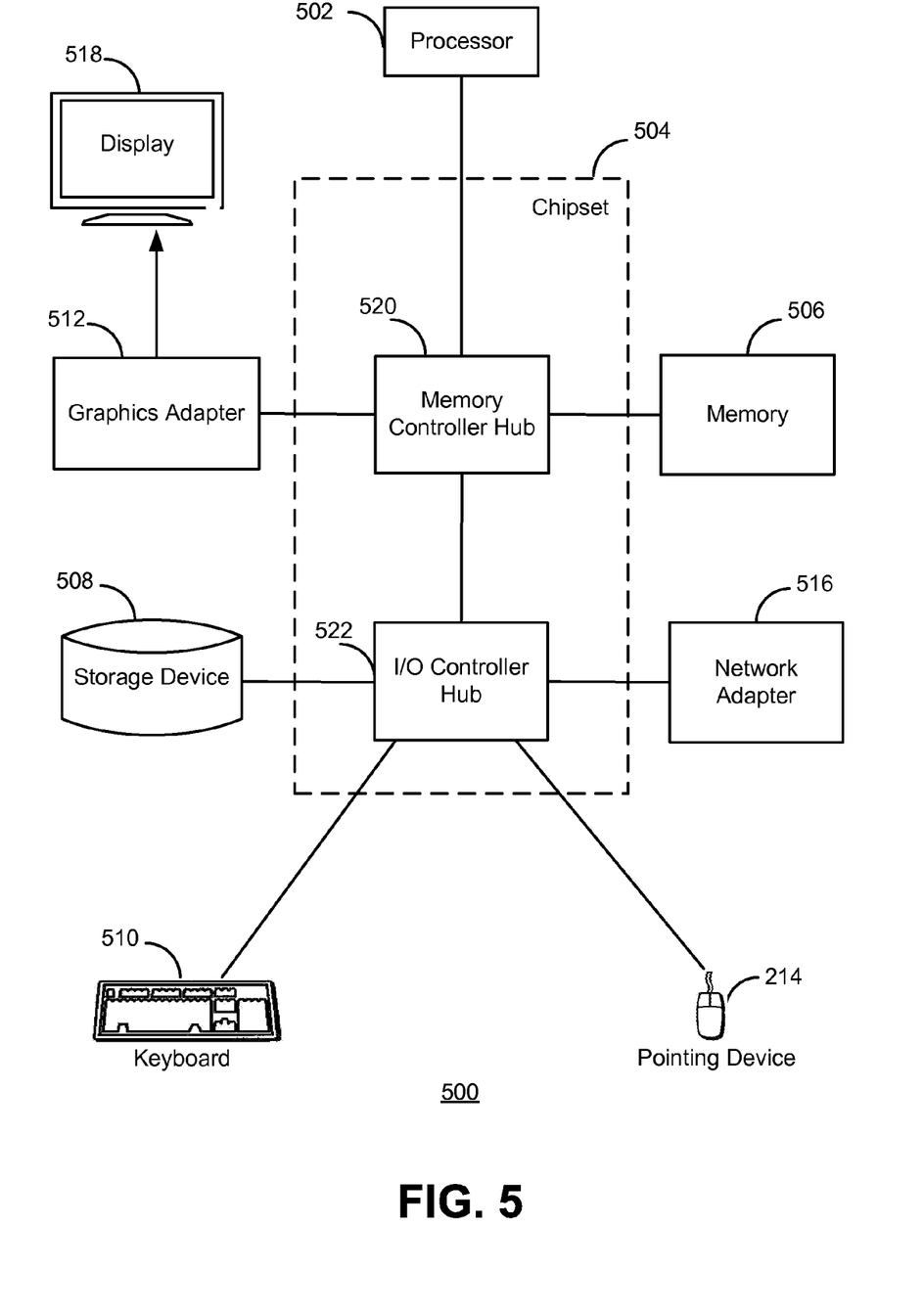
FIG. 5 is a high-level block diagram illustrating a typical computer for use as an image processing server according to one embodiment.

FIG. 5 is a high-level block diagram of a computer 500 for acting as an image processing server 100 according to one embodiment. Illustrated are at least one processor 502 coupled to a chipset 504. Also coupled to the chipset 504 are a memory 506, a storage device 508, a keyboard 510, a graphics adapter 512, a pointing device 514, and a network adapter 516. A display 518 is coupled to the graphics adapter 512. In one embodiment, the functionality of the chipset 504 is provided by a memory controller hub 520 and an I/O controller hub 522. In another embodiment, the memory 506 is coupled directly to the processor 502 instead of the chipset 504.

The storage device 508 is any non-transitory computer-readable storage medium, such as a hard drive, compact disk read-only memory (CD-ROM), DVD, or a solid-state memory device. The memory 506 holds instructions and data used by the processor 502. The pointing device 514 may be a mouse, track ball, or other type of pointing device, and is used in combination with the keyboard 510 to input data into the computer system 500. The graphics adapter 512 displays images and other information on the display 518. The network adapter 516 couples the computer system 500 to a local or wide area network.

As is known in the art, a computer 500 can have different and/or other components than those shown in FIG. 5. In addition, the computer 500 can lack certain illustrated components. In one embodiment, a computer 500 acting as an image processing server 100 lacks a keyboard 510, pointing device 514, graphics adapter 512, and/or display 518. Moreover, the storage device 508 can be local and/or remote from the computer 500 (such as embodied within a storage area network (SAN)). As is known in the art, the computer 500 is adapted to execute computer program modules for providing functionality previously described herein. In one embodiment, program modules are stored on the storage device 508, loaded into the memory 506, and executed by the processor 502.

The disclosure herein has been described in particular detail with respect to one possible embodiment. Those of skill in the art will appreciate that other embodiments may be practiced. First, the particular naming of the components and variables, capitalization of terms, the attributes, data structures, or any other programming or structural aspect is not mandatory or significant, and the mechanisms that implement the invention or its features may have different names, formats, or protocols. Also, the particular division of functionality between the various system components described herein is merely exemplary, and not mandatory; functions performed by a single system component may instead be performed by multiple components, and functions performed by multiple components may instead performed by a single component.

Some portions of above description present features in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the embodiments disclosed herein include process steps and instructions described herein in the form of an algorithm. It should be noted that the process steps and instructions could be embodied in software, firmware or hardware, and when embodied in software, could be downloaded to reside on and be operated from different platforms used by real time network operating systems.

The algorithms and operations presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will be apparent to those of skill in the art, along with equivalent variations. In addition, the present invention is not described with reference to any particular programming language. It is appreciated that a variety of programming languages may be used to implement the teachings of the present invention as described herein, and any references to specific languages are provided for invention of enablement and best mode of the present invention.

The embodiments disclosed herein are well suited to a wide variety of computer network systems over numerous topologies. Within this field, the configuration and management of large networks comprise storage devices and computers that are communicatively coupled to dissimilar computers and storage devices over a network, such as the Internet.

Finally, it should be noted that the language used in the specification has been principally selected for readability and instructional purposes, and may not have been selected to delineate or circumscribe the inventive subject matter. Accordingly, the disclosure herein is intended to be illustrative, but not limiting, of the scope of the invention, which is set forth in the following claims.

What is claimed is:

1. A computer-implemented method of removing illumination variation from an image, the method comprising:
    selecting, by one or more computers, an image containing varying illumination across a plurality of pixels within the selected image;
    identifying, by the one or more computers, patches of pixels from among the plurality of pixels within the selected image;
    calculating, by the one or more computers, similarities between pairs of patches of pixels from within the selected image based on pixel intensities associated with the pairs of patches of pixels;
    calculating, by the one or more computers, illumination values for the plurality of pixels within the selected image based on the calculated similarities between the pairs of patches of pixels from within the selected image; and
    removing, by the one or more computers, the illumination variation from the selected image based on the calculated illumination values for the plurality of pixels within the selected image.

2. The computer-implemented method of claim 1, wherein identifying the patches of pixels comprises:
    determining a plurality of adjacent pixels that are adjacent to a pixel in the selected image; and
    assigning the plurality of adjacent pixels and the pixel to a patch that is associated with the pixel.

3. The computer-implemented method of claim 2, wherein calculating the similarities comprises:
    randomly selecting a second pixel from the selected image;
    determining a second plurality of adjacent pixels that are adjacent to the second pixel in the selected image;
    assigning the second plurality of pixels and the second pixel to a second patch that is associated with the second pixel; and
    comparing the patch and the second patch based on a similarity of the pixel and the first patch and a similarity of the second pixel and the second patch.

4. The computer-implemented method of claim 1, wherein calculating the similarities between the pairs of patches comprises, for each patch:
    calculating a reflectance value of a pixel included in the patch.

5. The computer-implemented method of claim 4, further comprising:
    calculating a similarity between a first patch and a second patch from the selected image based on a difference of reflectance values associated with the first patch and the second patch; and
    calculating a weight for the similarity between the first patch and the second patch, the weight describing an influence that the similarity between the first patch and the second patch has on the calculation of the illumination values for the plurality of pixels within the selected image.

6. The computer-implemented method of claim 5, wherein calculating the similarity between the first patch and the second patch comprises:
    calculating a difference of a first reflectance value of a first pixel from the first patch and a second reflectance value of a second pixel from the second patch, wherein the first pixel is located at a center of the first patch and the second pixel is located at a center of the second patch.

7. The computer-implemented method of claim 5, wherein calculating the similarity between the first patch and the second patch comprises for each corresponding pair of pixels from the first patch and the second patch:
calculating a difference of a first reflectance value of a first pixel from the first patch and a second reflectance value of a second pixel from the second patch, wherein the first pixel and second pixel are respectively located at a same position in the first patch and the second patch.

8. The computer-implemented method of claim 5, wherein calculating the similarity between the first patch and the second patch comprises:
calculating a difference of a first distribution of reflectance values of pixels within the first patch and a second distribution of reflectance values of pixels within the second patch.

9. The computer-implemented method of claim 1, wherein calculating the illumination values comprises:
calculating an illumination value for a pixel within the selected image based on a difference between the illumination value for the pixel and an illumination value for a second pixel from one of the identified patches and a difference between a pixel intensity of the pixel and a pixel intensity of the second pixel.

10. The computer-implemented method of claim 9, wherein calculating the illumination values comprises:
optimizing an energy function to calculate the illumination value for the pixel within the selected image based on the difference between the illumination value for the pixel and the illumination value for the second pixel from one of the identified patches and the difference between the pixel intensity of the pixel and the pixel intensity of the second pixel and further based on a difference between the illumination value for the pixel and an illumination value for each third pixel that is directly adjacent to the pixel in the selected image; and
wherein an illumination value for a defined region of the selected image is used as an initial illumination value to optimize the energy function.

11. The computer-implemented method of claim 1, wherein the calculated illumination values are inverse illumination values and wherein removing the illumination variation from the selected image comprises:
for each pixel in the selected image, multiplying a pixel intensity of the pixel by an inverse illumination value calculated for the pixel.

12. A non-transitory computer-readable storage medium storing computer-executable code for removing illumination variation from an image, the code executable to perform steps comprising:
selecting an image containing varying illumination across a plurality of pixels within the selected image;
identifying patches of pixels from among the plurality of pixels within the selected image;
calculating similarities between pairs of patches of pixels from within the selected image based on pixel intensities associated with the pairs of patches of pixels;
calculating illumination values for the plurality of pixels within the selected image based on the calculated similarities between the pairs of patches of pixels from within the selected image; and
removing the illumination variation from the selected image based on the calculated illumination values for the plurality of pixels within the selected image.

13. The non-transitory computer-readable storage medium of claim 12, wherein the code is executable to perform further steps comprising:
determining a plurality of adjacent pixels that are adjacent to a pixel in the selected image; and
assigning the plurality of adjacent pixels and the pixel to a patch that is associated with the pixel.

14. The non-transitory computer-readable storage medium of claim 12, wherein the code is executable to perform further steps comprising, for each patch:
calculating a reflectance value of a pixel included in the patch.

15. The non-transitory computer-readable storage medium of claim 14, wherein the code is executable to perform further steps comprising:
calculating a similarity between a first patch and a second patch from the selected image based on a difference of reflectance values associated with the first patch and the second patch; and
calculating a weight for the similarity between the first patch and the second patch, the weight describing an influence that the similarity between the first patch and the second patch has on the calculation of the illumination values for the plurality of pixels within the selected image.

16. The non-transitory computer-readable storage medium of claim 15, wherein calculating the similarity between the first patch and the second patch comprises:
calculating a difference of a first reflectance value of a first pixel from the first patch and a second reflectance value of a second pixel from the second patch, wherein the first pixel is located at a center of the first patch and the second pixel is located at a center of the second patch.

17. The non-transitory computer-readable storage medium of claim 15, wherein calculating the similarity between the first patch and the second patch comprises for each corresponding pair of pixels from the first patch and the second patch:
calculating a difference of a first reflectance value of a first pixel from the first patch and a second reflectance value of a second pixel from the second patch, wherein the first pixel and second pixel are respectively located at a same position in the first patch and the second patch.

18. The non-transitory computer-readable storage medium of claim 15, wherein calculating the similarity between the first patch and the second patch comprises:
calculating a difference of a first distribution of reflectance values of pixels within the first patch and a second distribution of reflectance values of pixels within the second patch.

19. The non-transitory computer-readable storage medium of claim 12, wherein the code is executable to perform further steps comprising:
calculating an illumination value for a pixel within the selected image based on a difference between the illumination value for the pixel and an illumination value for a second pixel from one of the identified patches and a difference between a pixel intensity of the pixel and a pixel intensity of the second pixel.

20. The non-transitory computer-readable storage medium of claim 19, wherein the code is executable to perform further steps comprising:
optimizing an energy function to calculate the illumination value for the pixel within the selected image based on the difference between the illumination value for the pixel and the illumination value for the second pixel from one of the identified patches and the difference between the pixel intensity of the pixel and the pixel intensity of the second pixel and further based on a difference between the illumination value for the pixel and an illumination value for each third pixel that is directly adjacent to the pixel in the selected image; and wherein an illumination value for a defined region of the selected image is used as an initial illumination value to optimize the energy function.

21. The non-transitory computer-readable storage medium of claim 12, wherein the calculated illumination values are inverse illumination values and wherein the code is executable to perform further steps comprising:

for each pixel in the selected image, multiplying a pixel intensity of the pixel by an inverse illumination value calculated for the pixel.

22. A computer system for removing illumination variation from an image, the system comprising:

one or more computer processors; and a non-transitory computer-readable storage medium storing executable instructions configured to execute on the one or more computer processors, the instructions when executed by the one or more computer processors are configured to perform steps comprising:

selecting an image containing varying illumination across a plurality of pixels within the selected image;

identifying patches of pixels from among the plurality of pixels within the selected image;

calculating similarities between pairs of patches of pixels from within the selected image based on pixel intensities associated with the pairs of patches of pixels;

calculating illumination values for the plurality of pixels within the selected image based on the calculated similarities between the pairs of patches of pixels from within the selected image; and removing the illumination variation from the selected image based on the calculated illumination values for the plurality of pixels within the selected image.

23. The computer system of claim 22, wherein the instructions when executed by the computer processor are configured to perform further steps comprising:

determining a plurality of adjacent pixels that are adjacent to a pixel in the selected image; and assigning the plurality of adjacent pixels and the pixel to a patch that is associated with the pixel.

24. The computer system of claim 22, wherein the instructions when executed by the computer processor are configured to perform further steps comprising for each patch:

calculating a reflectance value of a pixel included in the patch.

25. The computer system of claim 24, wherein the instructions when executed by the computer processor are configured to perform further steps comprising:

calculating a similarity between a first patch and a second patch from the selected image based on a difference of reflectance values associated with the first patch and the second patch; and calculating a weight for the similarity between the first patch and the second patch, the weight describing an influence that the similarity between the first patch and the second patch has on the calculation of the illumination values for the plurality of pixels within the selected image.

26. The computer system of claim 25, wherein calculating the similarity between the first patch and the second patch comprises:

calculating a difference of a first reflectance value of a first pixel from the first patch and a second reflectance value of a second pixel from the second patch, wherein the first pixel is located at a center of the first patch and the second pixel is located at a center of the second patch.

27. The computer system of claim 25, wherein calculating the similarity between the first patch and the second patch comprises for each corresponding pair of pixels from the first patch and the second patch:

calculating a difference of a first reflectance value of a first pixel from the first patch and a second reflectance value of a second pixel from the second patch, wherein the first pixel and second pixel are respectively located at a same position in the first patch and the second patch.

28. The computer system of claim 25, wherein calculating the similarity between the first patch and the second patch comprises:

calculating a difference of a first distribution of reflectance values of pixels within the first patch and a second distribution of reflectance values of pixels within the second patch.

29. The computer system of claim 22, wherein the instructions when executed by the computer processor are configured to perform further steps comprising:

calculating an illumination value for a pixel within the selected image based on a difference between the illumination value for the pixel and an illumination value for a second pixel from one of the identified patches and a difference between a pixel intensity of the pixel and a pixel intensity of the second pixel.

30. The computer system of claim 29, wherein the instructions when executed by the computer processor are configured to perform further steps comprising:

optimizing an energy function to calculate the illumination value for the pixel within the selected image based on the difference between the illumination value for the pixel and the illumination value for the second pixel from one of the identified patches and the difference between the pixel intensity of the pixel and the pixel intensity of the second pixel and further based on a difference between the illumination value for the pixel and an illumination value for each third pixel that is directly adjacent to the pixel in the selected image; and wherein an illumination value for a defined region of the selected image is used as an initial illumination value to optimize the energy function.

31. The computer system of claim 22, wherein the instructions when executed by the computer processor are configured to perform further steps comprising:

for each pixel in the selected image, multiplying a pixel intensity of the pixel by an inverse illumination value calculated for the pixel.

* * * * *